United States Patent
Kocherginsky

(10) Patent No.: US 12,448,576 B2
(45) Date of Patent: Oct. 21, 2025

(54) MEMBRANE-BASED TREATMENT OF BIODIESEL COMPOSITIONS TO REMOVE IMPURITIES

(71) Applicant: NEXT-ChemX Corporation, Austin, TX (US)

(72) Inventor: Nikolai M Kocherginsky, Urbana, IL (US)

(73) Assignee: NEXT-ChemX Corporation, Austin, TX (US)

( * ) Notice: Subject to any disclaimer, the term of this patent is extended or adjusted under 35 U.S.C. 154(b) by 0 days.

(21) Appl. No.: 18/310,379

(22) Filed: May 1, 2023

(65) Prior Publication Data

US 2023/0348801 A1 Nov. 2, 2023

Related U.S. Application Data

(60) Provisional application No. 63/337,147, filed on May 1, 2022.

(51) Int. Cl.
   *C10G 53/10* (2006.01)
   *C10G 53/08* (2006.01)

(52) U.S. Cl.
   CPC ............ *C10G 53/10* (2013.01); *C10G 53/08* (2013.01); *C10G 2300/1055* (2013.01); *C10G 2400/04* (2013.01)

(58) Field of Classification Search
   CPC ........ B60G 2204/143; B60G 2204/416; C10G 2300/1055; C10G 2400/04; C10G 53/08; C10G 53/10; C10L 1/026; Y02E 50/10
   See application file for complete search history.

(56) References Cited

U.S. PATENT DOCUMENTS

| | | |
|---|---|---|
| 3,413,324 A | 11/1968 | Paulus |
| 4,062,882 A | 12/1977 | Sen Gupta |
| 4,101,563 A | 7/1978 | Landis |
| 4,533,501 A | 8/1985 | Sen Gupta |
| 4,617,126 A | 10/1986 | Funk et al. |
| 5,263,409 A | 11/1993 | van Eikeren et al. |

(Continued)

FOREIGN PATENT DOCUMENTS

| | | |
|---|---|---|
| EP | 1201737 A2 | 5/2002 |
| WO | 2008002154 A2 | 1/2008 |
| WO | 2017180167 A1 | 10/2017 |

OTHER PUBLICATIONS

Ostojcic et al., "Membrane Filtration as an Environmentally Friendly Method for Crude Biodiesel Purification", Kemija u Industriji, 2020, vol. 69, pp. 175-181 (Year: 2020).*

*Primary Examiner* — Ellen M McAvoy
*Assistant Examiner* — Chantel Graham
(74) *Attorney, Agent, or Firm* — David F. Dockery; The Navitas Intellectual Propery Group LLC

(57) ABSTRACT

Treatment of a biodiesel composition to remove impurities such as glycerol from the biodiesel composition using a membrane support. The biodiesel composition flows on one side of the membrane support and an acidic washing solution flows on the opposite side of the membrane support. Glycerol and other low molecular weight impurities having an affinity towards water are transported from the biodiesel composition to the acidic washing solution through the membrane support. The membrane support may include a plurality of hydrophilic polymer hollow fibers disposed in a support module.

27 Claims, 3 Drawing Sheets

(56) References Cited

U.S. PATENT DOCUMENTS

| | | | |
|---|---|---|---|
| 5,310,487 A | | 5/1994 | LaMonica |
| 5,545,329 A | | 8/1996 | LaMonica |
| 5,746,908 A | | 5/1998 | Mitchell |
| 5,868,935 A | * | 2/1999 | Sirkar ................. C22B 3/02 |
| | | | 210/639 |
| 6,117,327 A | | 9/2000 | Ciora et al. |
| 6,146,535 A | | 11/2000 | Sutherland |
| 6,228,239 B1 | | 5/2001 | Manalastas et al. |
| 6,471,869 B1 | | 10/2002 | Yanou et al. |
| 6,511,690 B1 | | 1/2003 | Tysinger et al. |
| 6,517,725 B2 | | 2/2003 | Spearman et al. |
| 7,494,676 B2 | | 2/2009 | Chakrabarti et al. |
| 7,935,157 B2 | | 5/2011 | Kozyuk et al. |
| 8,486,267 B2 | | 7/2013 | Seibert et al. |
| 10,065,132 B2 | | 9/2018 | Kocherginksy |
| 2002/0139711 A1 | | 10/2002 | Varadaraj |
| 2002/0198323 A1 | | 12/2002 | Morris |
| 2003/0209493 A1 | | 11/2003 | Koseoglu et al. |
| 2004/0079706 A1 | | 4/2004 | Mairal et al. |
| 2005/0118313 A1 | | 6/2005 | Jirjis et al. |
| 2006/0247454 A1 | | 11/2006 | Tysinger et al. |
| 2014/0021099 A1 | | 1/2014 | Sirkar et al. |
| 2014/0131279 A1 | | 5/2014 | Seibert et al. |
| 2017/0291121 A1 | | 10/2017 | Kocherginksy |

\* cited by examiner

MEMBRANE-BASED TREATMENT OF BIODIESEL COMPOSITIONS TO REMOVE IMPURITIES

CROSS-REFERENCE TO RELATED APPLICATIONS

This application claims the priority benefit of U.S. Provisional Patent Application No. 63/337,147 by Kocherginsky and filed on May 1, 2022, the disclosure of which is incorporated herein by reference in its entirety.

FIELD

The present disclosure relates to the treatment of biodiesel compositions and similar products to remove impurities such as glycerol and form a refined biodiesel product.

BACKGROUND

Most of the diesel fuel produced and consumed in the United States is refined from crude oil at petroleum refineries. U.S. petroleum refineries produce an average of 11 to 12 gallons of diesel fuel from each 42-gallon (U.S.) barrel of crude oil. Diesel internal combustion engines using refined petroleum as fuel lead to high carbon emissions. One of the better alternatives to petroleum-based fuel is the use of biofuel. The most important biofuel product is biodiesel which has much lower carbon emissions than petroleum-based fuels. In addition, biodiesel is much less toxic than petroleum diesel. Biodiesel's superior cetane rating means an easier engine startup and higher lubricity means less wear and tear on the engine over time. Fossil fuels, including petrodiesel, are non-renewable resources since they are the product of natural processes that have taken millions of years. In contrast, biodiesel is a renewable fuel since we can continually produce more plants such as palm oil, corn and soybeans needed to create it. Biodiesel is therefore a more sustainable option, which may become more crucial when fossil fuels are in short supply.

Biodiesel is made from vegetable oils through a transesterification reaction where the triglycerides react with methanol in presence of a catalyst such as sodium hydroxide or potassium hydroxide. The by-product of this reaction is glycerol, which must be separated from the biodiesel composition along with other impurities such as methanol, catalyst and water. Purification is an important step since the biodiesel composition should be pure enough to be usable as a fuel in engines. According to ASTM D6751, the maximum allowable concentration of glycerol in biodiesel is 0.240 wt. %.

Current purification of biodiesel compositions is achieved by a gravity settling step to separate the glycerol from biodiesel. Even after this settling step, there is still some amounts of glycerol, e.g., about 2%, in the biodiesel composition that must be removed. To remove the remaining glycerol, the biodiesel is washed with acid, neutralized with water and then dried. This conventional method is inefficient, time and energy consuming and expensive as it requires use of industrial equipment such as a mixer-settler and/or a centrifuge.

SUMMARY

Disclosed herein are processes for the purification of biodiesel compositions that are advantageous over the conventional purification processes discussed above. The processes disclosed herein implement a membrane support such as a hollow fiber membrane support module comprising a plurality of hollow fiber membrane supports, where a washing solution flows on one side of the hollow fiber membrane supports and a biodiesel composition flows on an opposite side of the hollow fiber membrane supports such that the two liquids are not substantially mixed. In this configuration, the large surface area of the hollow fiber membrane supports per unit volume of the support module facilitates the efficient extraction of glycerol and other impurities from the biodiesel composition into the washing solution. The process is fast, energy-efficient, does not require any transmembrane pressure or voltages, and has small foot-print.

The purpose of this disclosure is to provide a biodiesel purification process, where the biodiesel composition is not directly mixed with the washing solution, but is in contact with the washing solution over a large contact surface for extraction of the impurities. Rapid extraction of impurities from the biodiesel composition into the washing solution is possible because of high total area of pores per unit volume of membrane module and high mass transfer coefficient of these impurities diffusing through the hollow fiber pores filled with the acidic washing solution.

In one embodiment, a method for the treatment of a biodiesel composition to remove impurities from the biodiesel composition is disclosed. The method includes the steps of contacting a first surface of a membrane support with a biodiesel composition, where the biodiesel composition comprises at least one impurity selected from the group consisting of glycerol, methanol and alkali metal compounds. A second surface of the membrane support, opposite the first surface, is contacted with an acidic washing solution, wherein the at least one impurity is transported from the biodiesel composition to the acidic washing solution to form a refined biodiesel product.

The foregoing method is subject to a number of refinements that may be implemented alone or in any combination. In one refinement, the at least one impurity comprises glycerol. In one characterization, the concentration of glycerol in the refined biodiesel product is at least 50% less than the concentration of glycerol in the biodiesel composition. In another characterization, the concentration of glycerol in the biodiesel composition is at least about 1 wt. %. In yet another characterization, the concentration of glycerol in the refined biodiesel composition is not greater than about 0.24 wt. %.

In another refinement, the at least one impurity comprises methanol. In yet another refinement, the at least on impurity comprises an alkali metal compound. For example, the alkali metal compound may be an alkali metal compound selected from the group consisting of sodium hydroxide, sodium methoxide, potassium hydroxide and potassium methoxide, or combinations thereof. In one example, the biodiesel composition comprises glycerol, methanol and an alkali metal compound.

In another refinement, the biodiesel composition that is contacted with the membrane support is formed by transesterification of a vegetable oil to form a biodiesel intermediate and separation of a portion of glycerol from the biodiesel intermediate to form the biodiesel composition.

The membrane support may be subject to a number of configurations. In one configuration, the membrane support is a polymer membrane support. In one refinement, the polymer membrane support is a hydrophilic polymer membrane support. For example, the polymer membrane support may comprise a hydrophilic polymer selected from the group consisting of cellulose acetate, polysulfone, polyether sulfone, polyvinylidene fluoride, poly(2-hydroxyethyl methacrylate) and polyethylene glycol (PEG). In one implementation, the bulk of the membrane support is fabricated from the hydrophilic polymer. In another implementation, the membrane support comprises a surface coating of a hydrophilic polymer.

In another configuration, the membrane support comprises a plurality of hollow polymer fibers disposed in a membrane support module, the hollow polymer fibers having an outer diameter and a lumen therethrough having an inner diameter and defining a wall thickness between the inner diameter and the outer diameter. In one characterization, the average outer diameter of the plurality of hollow polymer fibers is at least about 100 µm. In another characterization, the average outer diameter of the plurality of hollow polymer fibers is not greater than about 500 µm. In yet another characterization, the average inner diameter of the plurality of hollow polymer fibers is at least about 50 µm. In yet another characterization, the average inner diameter of the plurality of hollow polymer fibers is not greater than about 400 µm.

With the use of hollow polymer fibers within a membrane support module, the step of contacting the first surface of the membrane support with the biodiesel composition may comprise contacting a shell side of the hollow polymer fibers within the membrane support module with the biodiesel composition, and contacting the second surface of the membrane support with an acidic washing solution by contacting an inner surface of the hollow fibers within the membrane support module with the acidic aqueous medium. In one characterization, the step of contacting the second surface of the membrane support with an acidic washing solution includes passing the acidic washing solution through the lumens of the hollow fibers.

In another implementation, the acidic washing solution has an initial pH of not greater than about pH 4. In another implementation, the acidic washing solution comprises phosphoric acid ($H_3PO_4$). In another implementation, the method includes the step of heating the biodiesel composition and contacting the first surface of the membrane support with the heated biodiesel composition. In one characterization, the biodiesel composition is heated to a temperature of at least about 30° C. In another implementation, the method includes heating the acidic washing solution and contacting the second surface of the membrane support with the heated acidic washing solution. In one characterization, the acidic washing solution is heated to a temperature of at least about 30° C. In another characterization, the acidic washing solution is heated to a temperature of not greater than about 100° C.

DESCRIPTION

Figure 1:
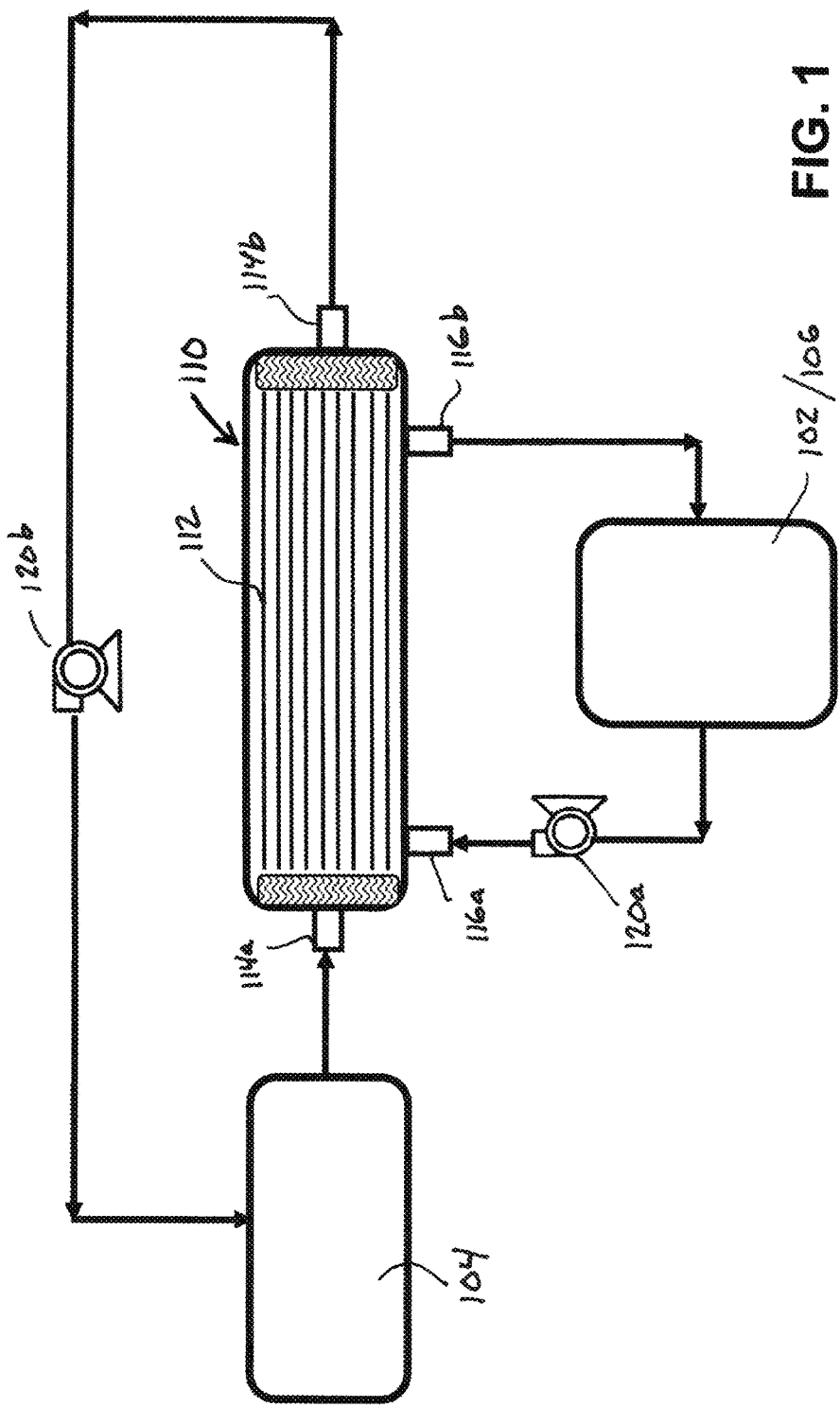
FIG. 1 illustrates a system for the treatment of a biodiesel composition in batch mode according to an embodiment.

The present disclosure relates to the treatment of a biodiesel composition to remove impurities from the biodiesel composition. As used herein, the term biodiesel composition refers to a liquid chemical composition that predominantly comprises mono-alkyl esters of long chain fatty acids, e.g., methyl esters, derived from vegetable oils or animal fats. Biodiesel is formed by the transesterification of the vegetable oils or animal fats using an alcohol such as methanol in the presence of a caustic (e.g., corrosive) catalyst, which produces the methyl esters and glycerol as a by-product. Examples of useful caustic catalysts include, but are not limited to, alkali metal compounds such as potassium hydroxide, potassium methoxide, sodium hydroxide or sodium methoxide.

After transesterification, the biodiesel intermediate will typically include about 10 wt. % glycerol, about 10 wt. % excess methanol and traces of the caustic catalyst, as well as traces of water. Traditional separation techniques, e.g., using mixer-settlers for gravity separation, can reduce the concentration of these impurities by allowing the impurities to settle below the biodiesel and extracting the biodiesel from the top. However, these techniques are often not capable of reducing the impurities to an acceptable level for use.

In one characterization, the biodiesel composition that is treated according to the present disclosure has a glycerol content of at least about 0.5 wt. % glycerol, such as at least about 1 wt. % glycerol or even at least about 1.5 wt. % glycerol. Typically the biodiesel composition will comprise not greater than about 10 wt. % glycerol, such as not greater than about 5 wt. % glycerol, or even not greater than about 3 wt. % glycerol, although the methods disclosed herein may be utilized to treat biodiesel compositions having higher concentrations of glycerol. Similarly, the concentration of methanol in the biodiesel composition may be at least about 0.5 wt. % methanol, such as at least about 1 wt. % methanol or even at least about 1.5 wt. % methanol. Typically the biodiesel composition will comprise not greater than about 10 wt. % methanol, such as not greater than about 5 wt. % methanol, although the methods disclosed herein may be used to treat biodiesel compositions having higher concentrations of methanol. In addition, the biodiesel compositions may include water as an impurity and traces of the caustic catalyst(s) noted above.

The methods and systems disclosed herein facilitate contact of the biodiesel composition with an aqueous washing solution without substantial mixing of the two phases. This may be achieved by supporting one of the phases within a support structure while contacting the other phase with a surface of the support structure. In one configuration, the support structure is a membrane, i.e., a membrane support. For example, the membrane support may be a porous planar structure wherein one of the phases is in contact with a first surface of the support and the other phase is in contact with a second surface of the membrane support, opposite the first surface, and impregnates the membrane support. As a result, the first and second phases are in contact along the first surface, but do not form a mixture as the second phase is not able to penetrate the membrane support. In one configuration, the membrane support is fabricated from a polymer, i.e., is a polymer membrane support.

In one particular configuration, the polymer membrane support comprises a plurality of hollow fibers, i.e., elongate hollow fibers with a porous sidewall defining a lumen through the fiber for the passage of one of the phases through the fibers. In a typical configuration, thousands of such hollow fibers are bundled, e.g., in a longitudinal orientation, and are operatively placed in a sealed cartridge, e.g., a cylindrical cartridge or shell, to form a hollow fiber membrane support module. The support module includes an inlet to and an outlet to direct one fluid through the lumen of the hollow fibers, as well as an inlet and outlet to direct the other fluid around the exterior of the hollow fibers, i.e., on the shell side of the hollow fibers. In one characterization, the aqueous washing solution, e.g., an acidic washing solution, is passed through the interior lumens of the hollow fibers and the biodiesel composition is passed along the exterior shell side of the hollow fibers. The use of one or more hollow fiber membrane support modules comprising thousands of hollow fibers enables the biodiesel composition and the washing solution to be in contact over a high surface area without substantial mixing of the two phases.

The hollow fibers may have a range of dimensions and the present disclosure is not limited to any particular dimensions. In one implementation, the hollow fibers may be characterized as having an outer diameter of at least about 100 µm, such as at least about 150 µm, such as at least about 200 µm. The hollow fibers may also be characterized as having an outer diameter of not greater than about 1000 µm, such as not greater than about 500 µm or even not greater than about 300 µm. In a further characterization, the lumen through the length of the hollow fibers may be characterized as having an inner diameter of at least about 50 µm, such as at least about 75 µm, or even at least about 100 µm. The lumen may also be characterized as having an inner diameter of not greater than about 300 µm, such as not greater than about 250 µm, such as not greater than about 200 µm. The outer diameter and the inner diameter define a wall therebetween, and the walls of the hollow fibers may be characterized as having a thickness of at least about 10 µm, such as at least about 30 µm, and may also be characterized as having a wall thickness of not greater than about 150 µm. In another characterization, the hollow fibers may be characterized as being porous in the dry state, e.g., having pores of from about one nm to about 25 nm in diameter and a total porosity of from about 20 vol. % to about 40 vol. %.

The hollow fibers may be formed from polymers. In one characterization, the hollow fibers are hydrophilic, e.g., comprising a hydrophilic material on at least the surface of the hollow fibers opposite the washing solution. As used herein, the term hydrophilic is used to describe a material, e.g., a polymer, having a static water contact angle (8) that is less than 90°. In this configuration, the aqueous acidic washing solution will penetrate and be supported by the hollow fibers while the biodiesel composition, which is unable to penetrate the hydrophilic support, will pass along the surface of the hollow fibers. For example, the hollow fibers may be formed from a hydrophilic polymer, e.g., where the bulk of the hollow fibers is formed from the hydrophilic polymer. Examples of useful hydrophilic polymers include, but are not limited to, cellulose acetate, polysulfone (PS), polyether sulfone (PES), polyvinylidene fluoride (PVDF), poly(2-hydroxyethyl methacrylate), polyethylene glycol (PEG), and the like. One example of such a hollow fiber is illustrated in U.S. Pat. No. 4,587,168 by Miyagi et al., which is incorporated herein by reference in its entirety. Alternatively, the base polymer (e.g., forming the bulk of the fibers) may be a hydrophobic polymer and the hydrophobic polymer may be treated (e.g., coated or impregnated) with a hydrophilic material, e.g., a hydrophilic polymer, so that the surface of the hollow fibers is hydrophilic. In yet another configuration, hydrophilic polymer(s) and hydrophobic polymer(s) may be blended and processed to form hollow fibers having a hydrophilic surface. The hydrophilic nature of the fiber leads to the hollow fibers swelling with the washing solution leading to a high distribution coefficient and high permeability of low molecular weight impurities, such as glycerol, methanol, water and inorganic ions between the biodiesel composition and the membrane support.

As noted above, the hollow fibers may be characterized as being porous in the dry state. However, when the hollow fibers are contacted with the acidic washing solution, the hollow fibers may swell due to the absorption of the aqueous acidic washing solution. As a result of this swelling, substantially all of the porosity may be eliminated. Thus, the hollow fibers in use may be characterized as being swollen and substantially non-porous. Neglecting concentration in the flowing washing solution, the flux J of an impurity through the membrane support, e.g., through the hollow fiber walls, with a concentration C in the biodiesel composition is described by:

$$J = \frac{KD}{L}C$$

where D is the diffusion coefficient in the membrane support with a wall thickness L. The distribution coefficient K for small hydrophilic impurities in this instance is relatively high. The diffusion coefficient in the membrane support that is swollen by washing solution is also high, and both these factors lead to high specific flux per unit area and high selectivity of the washing process.

The hollow fibers may also be characterized as being symmetric, in contrast with asymmetric hollow fibers. A symmetric hollow fiber may be characterized as one whose pore size does not appreciably change through the thickness of the hollow fiber wall. In contrast, an asymmetric hollow fiber includes at least two distinct layers with different properties, such as morphology, pore size and/or permeability. Typically, asymmetric hollow fibers are characterized by a relatively dense and thin selective layer supported on a thicker, porous substructure layer.

As is discussed above, an acidic washing solution may be passed through the lumens of the hollow fibers while the biodiesel composition is passed on the exterior of the hollow fiber membrane supports, e.g., on the shell side of a hollow fiber membrane support module. The acidic washing solution may comprise an acid selected from phosphoric acid, citric acid and their mixtures, and in one characterization the acidic washing solution comprises phosphoric acid ($H_3PO_4$). The initial pH of the acidic washing solution may be at least about pH 1 such as at least pH 2 and may be not greater than about pH 7 such as not greater than about pH 4. In one particular characterization, the initial pH of the acidic washing solution is at least about pH 2 and is not greater than about pH 3.

Flowing within the hollow fibers, i.e., through the lumens thereof, the acidic washing solution may remove impurities from the biodiesel composition including glycerol, methanol, water and the catalyst or catalyst by-products. In one characterization, the biodiesel composition has a glycerol content of at least about 0.5 wt. % glycerol, such as at least about 1 wt. % glycerol or even at least about 1.5 wt. % glycerol. After treatment of the biodiesel composition according to the methods disclosed herein, the refined biodiesel product may have a glycerol concentration of not greater than about 0.24 wt. % glycerol, not greater than about 0.20 wt. % glycerol, not greater than about 0.15 wt. % glycerol, not greater than about 0.10 wt. % glycerol, not greater than about 0.05 wt. % glycerol, or even practically zero, e.g., not greater than about 0.010 wt. % glycerol. In another characterization, the method may reduce the concentration of glycerol in the biodiesel composition by at least about 40%, such as by at least about 50%, such as at least about 60% or even at least about 75%.

In one implementation, the method may also include the step of heating the biodiesel composition and contacting the heated biodiesel composition with the membrane support, e.g., by flowing the heated biodiesel composition through the shell side of a membrane support module. For example, the biodiesel composition may be heated to a temperature of at least about 30° C., such as at least about 40° C., such as at least about 50° C. Typically, it will not be necessary to heat the biodiesel composition to more than about 100° C. It is believed that heating the biodiesel composition to an elevated temperature, e.g., above ambient temperature, may facilitate the treatment of the biodiesel composition by reducing gumming within the membrane support module. In a similar fashion, the washing solution may also be heated, e.g., to a temperature of at least about 30° C., such as at least about 40° C., such as at least about 50° C., and not greater than about 100° C.

FIG. 1 illustrates a system for implementing a method for the treatment of a biodiesel composition according to an embodiment of the present disclosure. The system includes a hollow fiber membrane support module 110 comprising a plurality of hydrophilic hollow fibers 112 operatively contained within the support module 110. An acidic washing solution 104 is transported (e.g., pumped using pump 120b) into the support module through an inlet port 114a that is in fluid communication with the interior surface (e.g., the lumen) of the hollow fibers 112. At the same time, a biodiesel composition 102 is transported (e.g., pumped using pump 120a) through inlet port 116a into the support module 110 on the shell side of the hollow fibers 112. Within the module 110, the acid washing solution 104 impregnates the hollow fibers 112 which act as a support for the acid washing solution 104. Due to the hydrophilic nature of the hollow fibers 112, the biodiesel composition 102 contacts the surface of the hollow fibers 112 without impregnating the fibers and therefore contacts the acidic washing solution 104 without substantial mixing of the two phases. As a result, impurities such as glycerol and methanol are transferred from the biodiesel composition 102 to the acidic washing solution 104 within the support module 110. The acidic washing solution is then extracted through outlet port 114b and is recirculated back to the inlet port 114a. Alternatively, the acidic washing solution 104 may be discarded after one pass through the support module 110. The treated biodiesel composition is extracted through outlet port 116b and may be extracted or may be recirculated until a refined biodiesel product 106 is formed, e.g., containing a desirable lower concentration of impurities than the biodiesel composition 102. Although the acidic washing solution 104 and the biodiesel composition 102 are illustrated as being contacted in concurrent flow, it will be appreciated that a counter-current flow may also be utilized.

Figure 2:
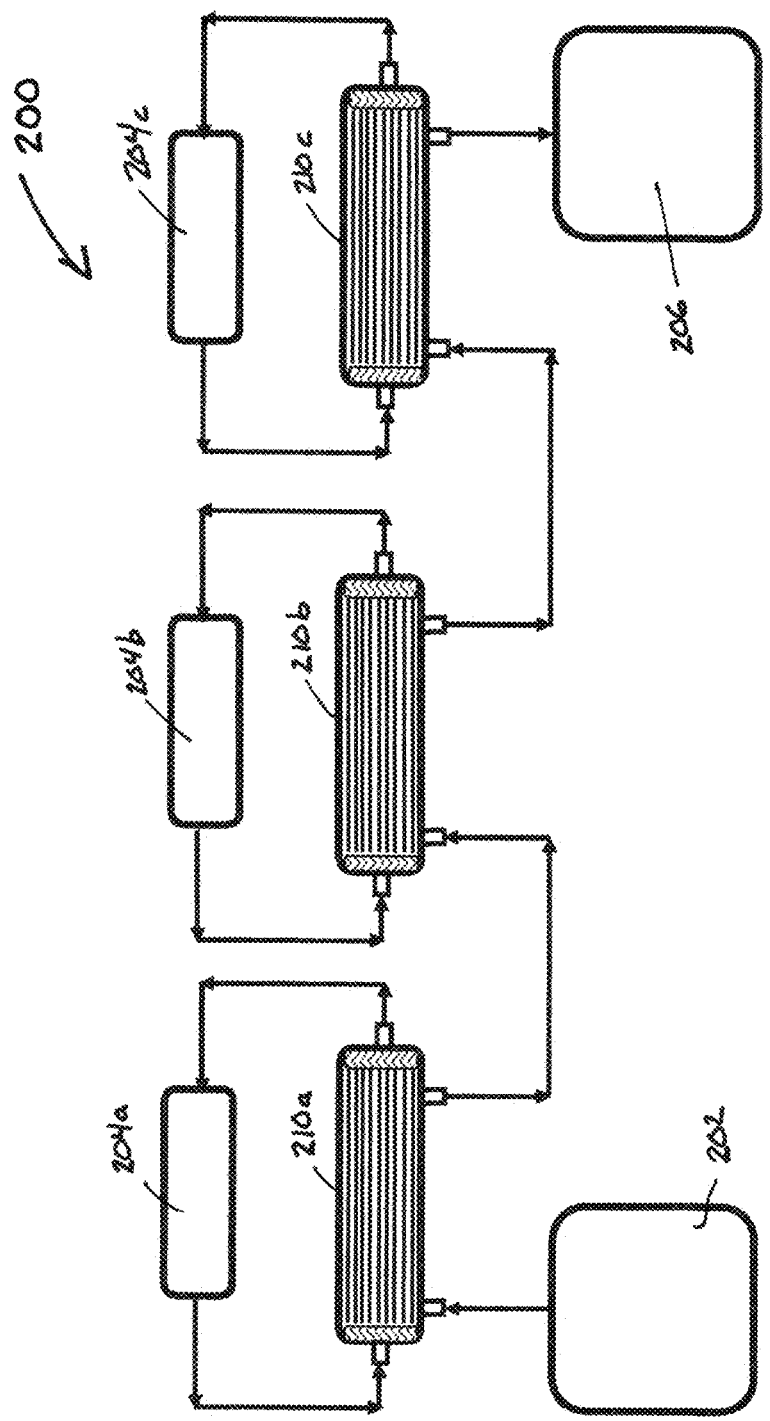
FIG. 2 illustrates a system for the treatment of a biodiesel composition in continuous mode according to an embodiment.

FIG. 1 illustrates the method being carried out in batch mode, e.g., where the biodiesel composition is recirculated until a desired reduced concentration of impurities has been attained. FIG. 2 illustrates an alternative system 200 wherein the method is carried out in series, e.g., in a continuous process. As illustrated in FIG. 2, each of three hollow fiber membrane support modules 210a/210b/210c is separately coupled to three sources of acidic washing solution 204a/204b/204c such that acidic washing solution flows in a closed loop through each of the modules. Alternatively, the acidic washing solutions 204a/204b/204c may be discarded after one pass through its respective support module. A biodiesel composition 202 is transferred through each of the membrane support modules 210a/210b/210c in series. As a result, a refined biodiesel product 206 may be obtained in a continuous, e.g., one-run-through, process. It will be appreciated that FIG. 2 is for purposes of illustration only and the system may include as many hollow fiber membrane support modules as is deemed necessary to obtain a refined biodiesel product of desired purity, including a single module.

Although transmembrane pressure is not required as a driving force for the transfer of impurities from the biodiesel composition to the acidic washing solution, it may be desirable to apply a slight pressure, e.g., slightly above atmospheric pressure, to the acidic washing solution to reduce the possibility of the biodiesel composition leaking into the acidic washing solution.

Although the foregoing methods and systems have been described as being implemented using hollow fibers, e.g., hollow fiber membrane modules, other implementations of the methods and systems are contemplated. For example, a membrane bioreactor (MBR) may by utilized as a support for the washing solution where the MBR is submerged into a tank holding the biodiesel composition. On example is the MBR disclosed in U.S. Pat. No. 7,160,454 by Vossenkaul which is incorporated herein by reference in its entirety.

PROPHETIC EXAMPLES

Example 1

A biodiesel composition is synthesized by blending pomace olive oil with methanol and a caustic catalyst, namely potassium hydroxide (KOH), to form a composition comprising about 83 vol. % olive oil, about 16.6 vol. % methanol and about 0.33 vol. % KOH. The mixture is placed in a vessel, mixed and allowed to settle resulting in a separation of a biodiesel composition from an aqueous phase comprising a portion of the glycerol and unreacted methanol. After removal of the upper biodiesel composition, the biodiesel composition is found to contain impurities of glycerol, KOH and potassium methoxide ($CH_3OK$).

A 500 ml sample of the biodiesel composition is pumped through the shell-side of a hollow fiber membrane support module including hydrophilic polymer hollow fibers, while 1000 ml of a phosphoric acid washing solution having a pH of about 2.57 is pumped through the hollow fibers for a total time of about 30 minutes at room temperature.

Figure 3:
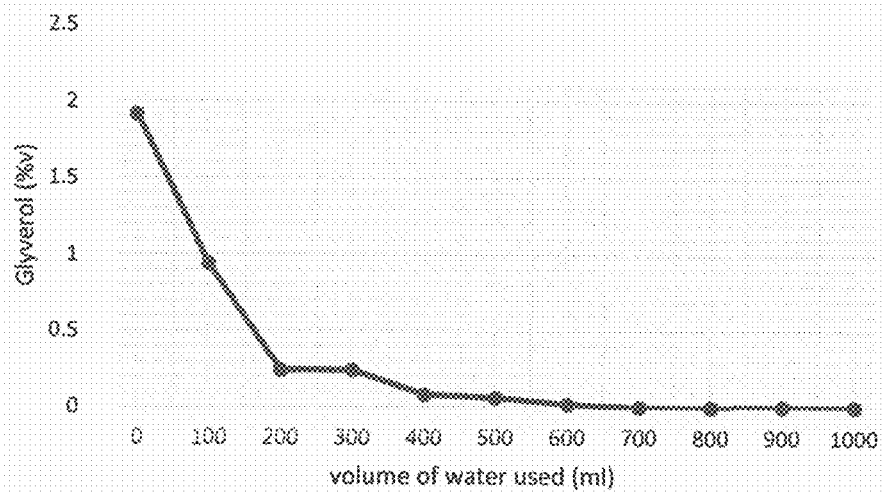
FIG. 3 illustrates the reduction in glycerol from a biodiesel composition according to an embodiment.

As illustrated in FIG. 3, the initial concentration of glycerol in the biodiesel composition is about 1.9 vol. % but decreases rapidly to less than 0.3 vol. % after only about 200 ml of acidic washing solution passes through the hollow fiber membrane support module. The glycerol is practically eliminated after only about 700 ml of the acidic washing solution passes through the support module.

Figure 4:
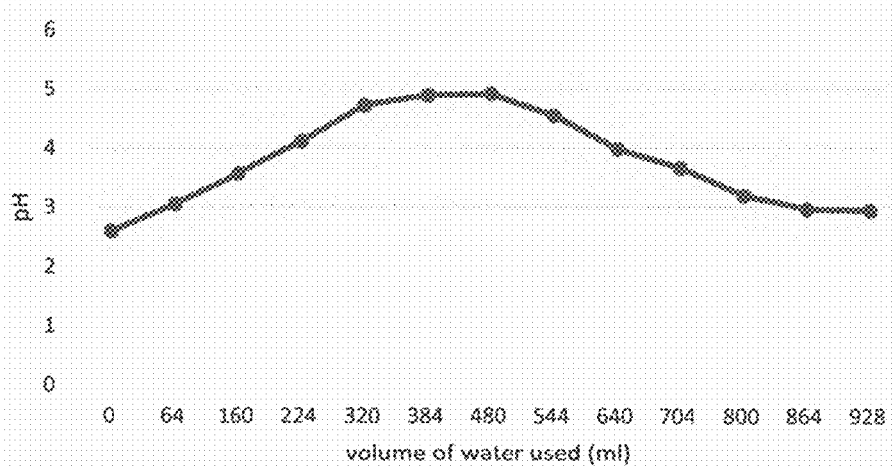
FIG. 4 illustrates the change in pH of an acidic washing solution used to treat a biodiesel composition according to an embodiment.

As is illustrated in FIG. 4, the pH of the acidic washing solution after one pass through the membrane support module initially increases from about pH 2.5 to about pH 5.0, but then decreases and returns to its approximate initial value. This may be explained by the hydrolysis of potassium methoxide ($CH_3OK$) and the formation and removal of KOH during the biodiesel treatment. The hydrolysis reaction reaches its maximum at about 15 mins and after that the dominant step is KOH removal from the biodiesel composition and the pH of the aqueous washing solution drops to its initial pH.

While various embodiments of a method and system for the treatment of a biodiesel composition have been described in detail, it is apparent that modifications and adaptations of those embodiments will occur to those skilled in the art. However, it is to be expressly understood that such modifications and adaptations are within the spirit and scope of the present disclosure.

What is claimed is:

1. A method for the treatment of a biodiesel composition to remove impurities from the biodiesel composition, comprising the steps of:
contacting a first surface of a membrane support with a biodiesel composition comprising at least one impurity selected from the group consisting of glycerol, methanol and alkali metal compounds; and
contacting a second surface of the membrane support, opposite the first surface, with an acidic washing solution,
wherein the at least one impurity is transported from the biodiesel composition to the acidic washing solution to form a refined biodiesel product.

2. The method recited in claim 1, wherein the at least one impurity comprises glycerol.

3. The method recited in claim 2, wherein the concentration of glycerol in the refined biodiesel product is at least 50% less than the concentration of glycerol in the biodiesel composition.

4. The method recited in claim 2, wherein the concentration of glycerol in the biodiesel composition is at least about 1 wt. %.

5. The method recited in claim 2, wherein the concentration of glycerol in the refined biodiesel composition is not greater than about 0.24 wt. %.

6. The method recited in claim 2, wherein the biodiesel composition further comprises methanol.

7. The method recited in claim 2, wherein the biodiesel composition further comprises an alkali metal compound.

8. The method recited in claim 7, wherein the alkali metal compound is selected from the group consisting of sodium hydroxide, sodium methoxide, potassium hydroxide and potassium methoxide.

9. The method recited in claim 1, wherein the biodiesel composition that is contacted with the membrane support is formed by the transesterification of a vegetable oil to form a biodiesel intermediate and the separation of a portion of glycerol from the biodiesel intermediate to form the biodiesel composition.

10. The method recited in claim 1, wherein the membrane support is a polymer membrane support.

11. The method recited in claim 10, wherein the polymer membrane support is a hydrophilic polymer membrane support.

12. The method recited in claim 11, wherein the polymer membrane support comprises a hydrophilic polymer selected from the group consisting of cellulose acetate, polysulfone, polyether sulfone, polyvinylidene fluoride, poly(2-hydroxyethyl methacrylate) and polyethylene glycol (PEG).

13. The method recited in claim 11, wherein a bulk of the membrane support is fabricated from the hydrophilic polymer.

14. The method recited in claim 1, wherein the membrane support comprises a plurality of hollow polymer fibers disposed in a membrane support module, the hollow polymer fibers having an outer diameter and a lumen therethrough having an inner diameter and defining a wall thickness between the inner diameter and the outer diameter.

15. The method recited in claim 14, wherein the average outer diameter of the plurality of hollow polymer fibers is at least about 100 µm.

16. The method recited in claim 14, wherein the average outer diameter of the plurality of hollow polymer fibers is not greater than about 500 µm.

17. The method recited in claim 14, wherein the average inner diameter of the plurality of hollow polymer fibers is at least about 50 µm.

18. The method recited in claim 14, wherein the average inner diameter of the plurality of hollow polymer fibers is not greater than about 400 µm.

19. The method recited in claim 14, wherein:
the step of contacting the first surface of the membrane support with the biodiesel composition comprises contacting a shell side of the hollow polymer fibers within the membrane support module with the biodiesel composition; and
the step of contacting the second surface of the membrane support with an acidic washing solution comprises contacting an inner surface of the hollow fibers within the membrane support module with the acidic aqueous medium.

20. The method recited in claim 19, wherein the step of contacting the second surface of the membrane support with an acidic washing solution comprises passing the acidic washing solution through the lumens of the hollow fibers.

21. The method recited in claim 1, wherein the acidic washing solution has an initial pH of not greater than about pH 4.

22. The method recited in claim 1, wherein the acidic washing solution comprises phosphoric acid.

23. The method recited in claim 1, comprising the step of heating the biodiesel composition and contacting the first surface of the membrane support with the heated biodiesel composition.

24. The method recited in claim 23, wherein the step of heating the biodiesel composition comprises heating the biodiesel composition to a temperature of at least about 30° C.

25. The method recited in claim 1, further comprising the step of heating the acidic washing solution and contacting the second surface of the membrane support with the heated acidic washing solution.

26. The method recited in claim 25, wherein the step of heating the acidic washing solution comprises heating the acidic washing solution to a temperature of at least about 30° C.

27. The method recited in claim 26, wherein the step of heating the acidic washing solution comprises heating the acidic washing solution to a temperature of not greater than about 100° C.

* * * * *